Patented Nov. 30, 1948

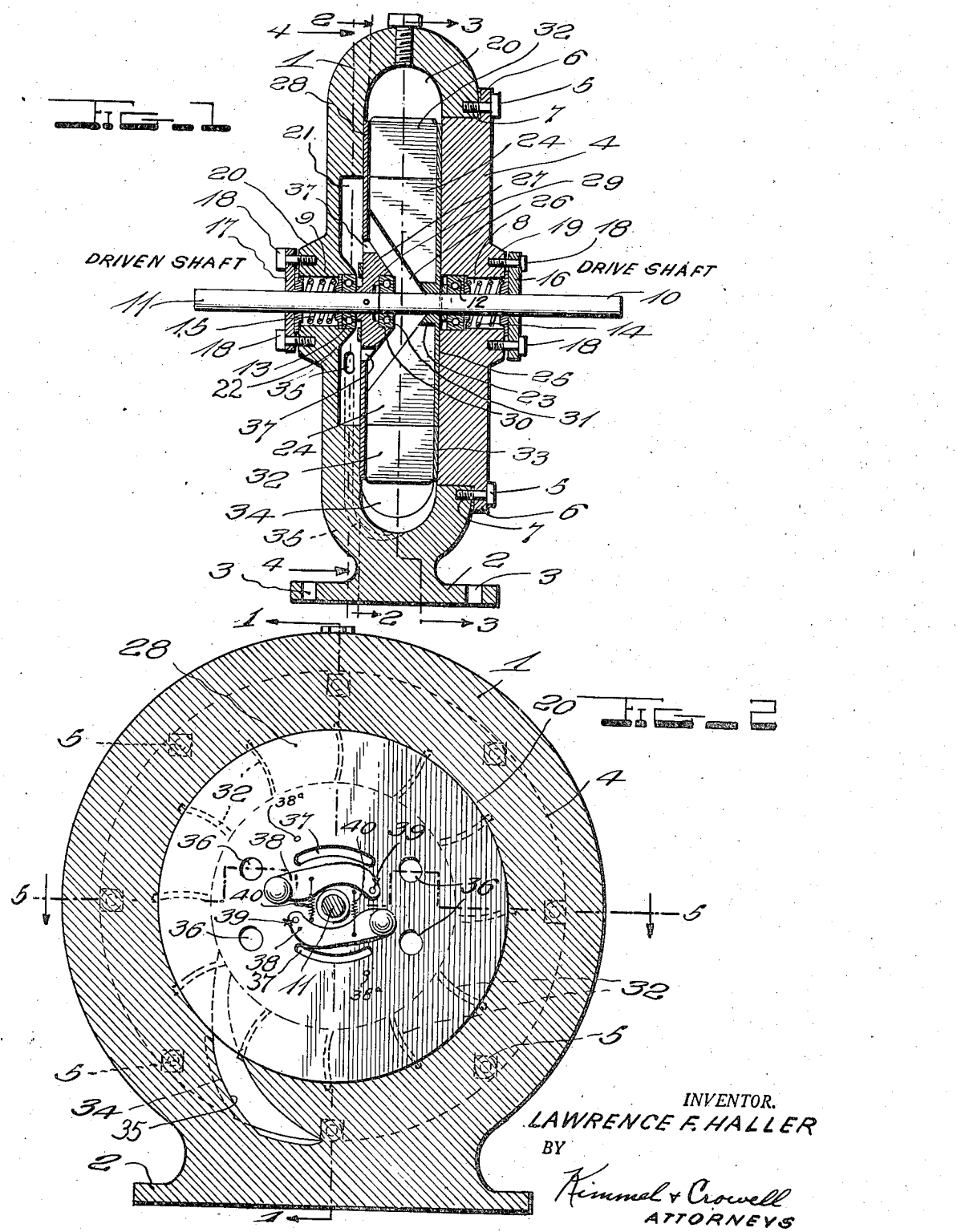

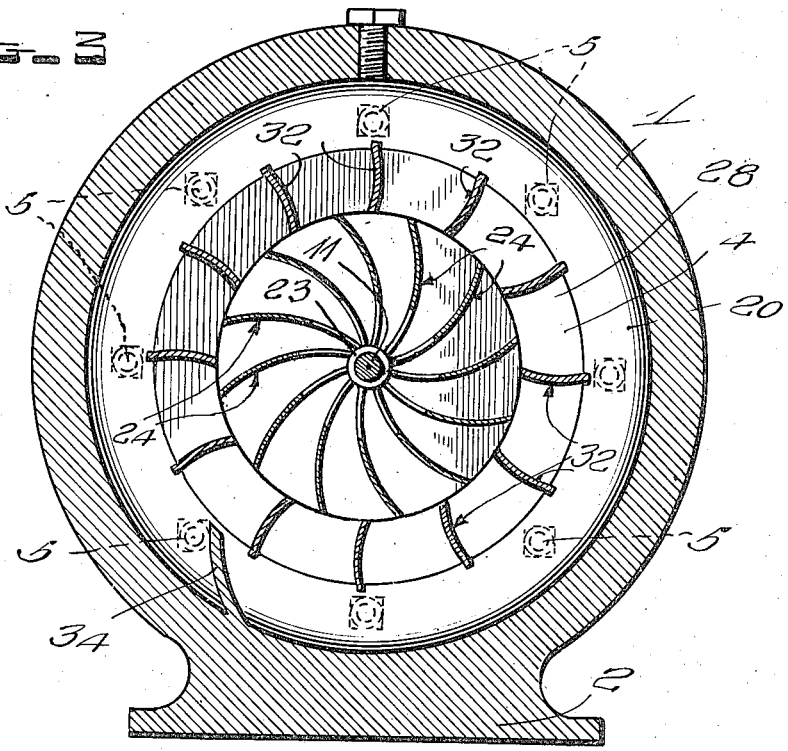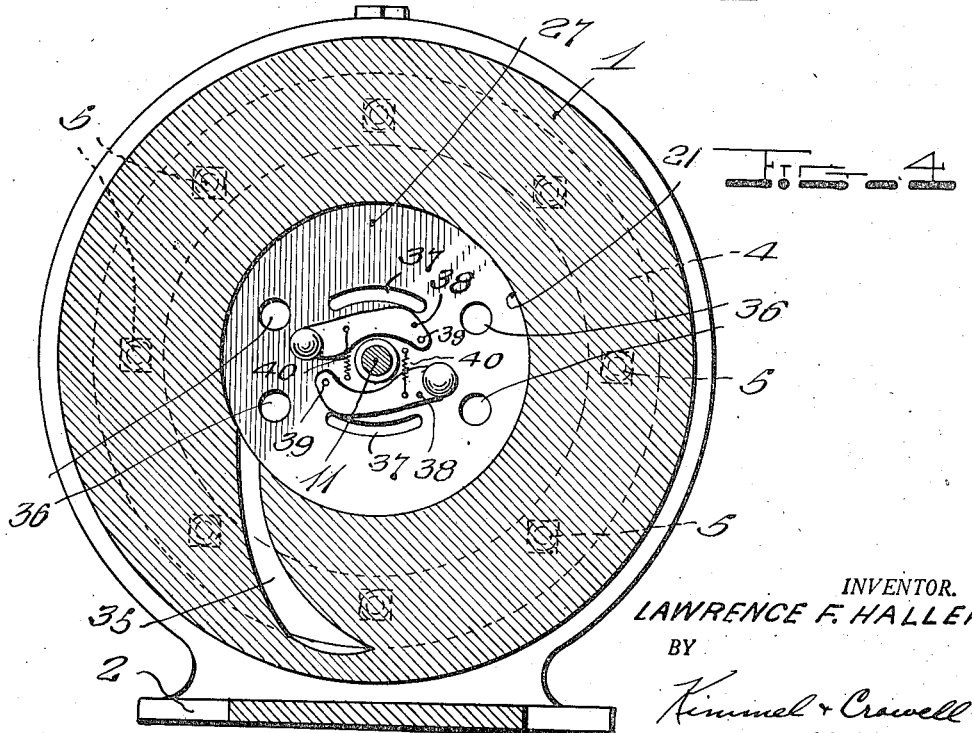

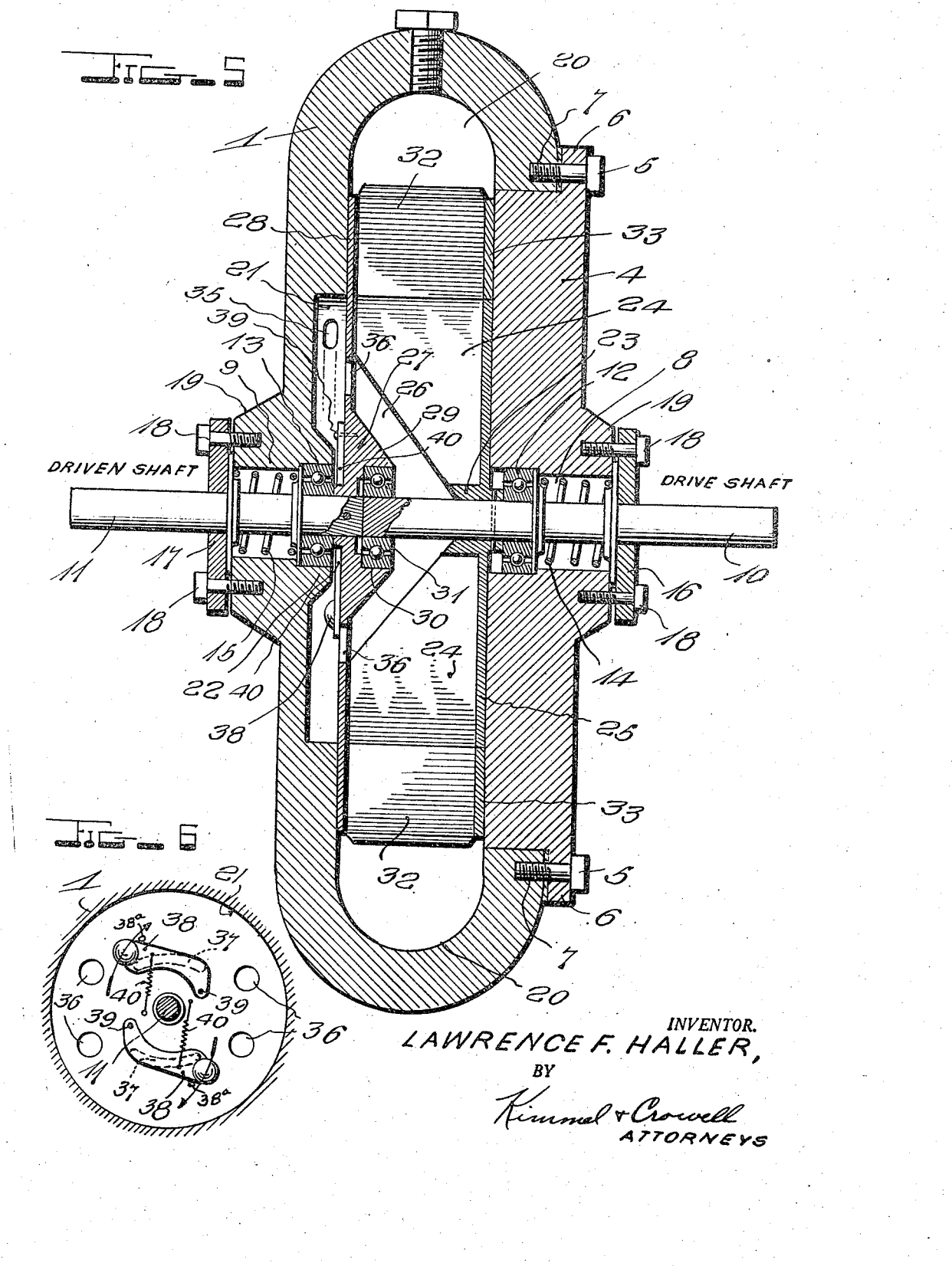

2,455,249

UNITED STATES PATENT OFFICE 2,455,249

ROTARY HYDRAULIC COUPLING WITH AUTOMATIC SPEED CONTROL

Lawrence F. Haller, San Antonio, Tex.

Application March 26, 1945, Serial No. 584,765

3 Claims. (Cl. 60—54)

This invention relates to a hydraulic drive and it is one object of the invention to provide a drive of this character of such construction that rotary motion may be transmitted smoothly from a drive shaft to a driven shaft and the driven shaft allowed to gradually pick up speed after the drive shaft has been started rotating.

Another object of the invention is to permit the driven shaft to increase its speed to a predetermined rate and then continue rotating at the desired speed without adjusting the rate at which the drive shaft turns.

Another object of the invention is to provide a transmission wherein there is provided a casing housing rotors, one being carried by the drive shaft and the other by the driven shaft, and said shafts carrying rotors enclosed in the housing or casing and so formed that liquid impelled by vanes of the rotor carried by the driving shaft may act upon vanes of the rotor of the driven shaft to gradually increase the speed of the driven shaft and then rotate the driven shaft at a steady rate of speed.

Another object of the invention is to so form the rotors of the two shafts that after the speed at which the driven shaft reaches a predetermined rate the liquid will be bypassed in the housing without increasing or decreasing the speed of the driven shaft.

Another object of the invention is to provide a hydraulic transmission which is simple in construction, efficient in operation, and consists of a comparatively few number of parts which are easy to assemble and not liable to get out of working order.

To the foregoing objects and others which may hereinafter appear, the invention consists of the novel construction, combination and arrangement of parts as will be more specifically referred to and illustrated in the accompanying drawings, but it is to be understood that changes, variations and modifications may be resorted to which fall within the scope of the invention as claimed.

The invention is illustrated in the accompanying drawings wherein:

Figure 1 is a vertical sectional view taken transversely through the improved transmission along 1—1 of Figure 2.

Figure 2 is a sectional view taken along line 2—2 of Figure 1.

Figure 3 is a sectional view taken along line 3—3 of Figure 1.

Figure 4 is a sectional view taken along line 4—4 of Figure 1.

Figure 5 is a sectional view upon an enlarged scale taken horizontally through the transmission along line 5—5 of Figure 2.

Figure 6 is a fragmentary view illustrating operation of the governor controlling speed at which the driven shaft rotates.

This improved transmission has a casing or housing 1 which is of circular outline and provided with a base 2 formed with a suitable number of openings 3 so that the housing may be firmly mounted in upright position upon a support or foundation. The housing or casing is open at one side and this open side is normally closed by a block 4 which fits snugly into the open side of the casing and is held in place by screws 5 which pass through openings in the marginal flange 6 of the block and engage in threaded sockets 7 formed in the casing. Aligned openings 8 and 9 are formed through the block and the opposite side wall of the casing to accommodate a drive shaft 10 and a driven shaft 11 which are rotatably mounted through bearings 12 and 13 and urged towards each other by springs 14 and 15 which are housed in the openings and have their inner ends abutting the bearings and their outer ends abutting plates 16 and 17. These plates fit snugly about the shafts and are removably held in closing relation to outer ends of the openings by screws 18 which pass through openings in the plates and into sockets formed in outstanding bosses 19 which surround the openings 8 and 9. By this arrangement the two shafts may rotate but leakage of liquid, such as oil, will be prevented. The casing 1 defines a circular chamber 20 and the solid side wall of the casing is formed with a circular chamber 21 constituting an auxiliary chamber which is concentric to the chamber 20 and also concentric to the opening 9 which it surrounds. The inner end of opening 9 is surrounded by an annular boss 22 which projects inwardly of the casing and is tapered inwardly of the casing but is of less depth than the chamber 21. Any suitable motive source may be employed for rotating the drive shaft 10 and suitable means may also be provided for taking off power from the driven shaft 11, or the driven shaft may be directly connected with machinery to be actuated by shaft 11.

The drive shaft 10 carries at its inner end a rotor 23 having a hub from which extend radiating blades 24 reinforced by a disc 25 and gradually increasing in width towards their outer end portions which are of an even width, as shown in Figures 1 and 5. Referring to these figures it will be seen that the sloping side edges of the vanes or blades 24 define an annular pocket 26 about the inner end portion of the drive shaft 10 and that this pocket is of conical formation and tapers towards the hub of the rotor 23.

The driven shaft also carries a rotor 27 having a circular side plate 28 and a block or hub 29 formed centrally of the plate and of frusto-conical formation. This block or hub tapers inwardly of the casing and fits within the chamber 26 where it is spaced well away from the tapered portions of the blades 24 of rotor 23. The rotors turn with the shafts 10 and 11 and block 29 is formed with a pocket 30 in which is a bearing 31 carried by the inner end of shaft 10, therefore the inner ends of the shafts will be held in alignment with each other but may rotate independently of each other. The disc or plate 28 projects radially from the blades 24 and this projecting marginal portion of plate 28 carries blades 32 which extend inwardly from the plate and are of such length that outer ends of the blades 24 may pass inner ends of blades 32 in close proximity thereto during operation of the transmission. An annular plate or disc 33 serves as a brace for the blades 32 at opposite sides thereof from plate 28 and this annular plate 33 is of such dimensions that it fits snugly about the disc or plate 25 of rotor 23. It should also be noted that outer ends of the blades 32 project slightly from the plates 28 and 33 for acting upon liquid in the chamber 20 of the casing.

When the transmission is in operation the drive shaft 10 is rotated from a motor or other driving medium and as the rotor 23 turns with this shaft in the casing oil or other liquid with which the chamber of the casing is filled will be impelled by the blades 24 so that the liquid is forced towards the periphery of the chamber 20 and moved circumferentially therein. The moving liquid acts upon the blades 32 and imparts rotation to the driven shaft 11. As the rotor or impeller 23 turns, the liquid is driven outwardly from the pocket 26 towards the periphery of the chamber 20 and then circumferentially thereof until it strikes the deflector 34 and this deflector plate directs liquid through the passage 35 into the chamber 21 from which it flows through openings 36 and slots 37 into chamber 26 for recirculation through the chamber 20 by the impeller and action upon blades of the rotor 28. It is desired to have the speed at which the driven shaft 11 rotates gradually increase and then maintain a predetermined speed. In order to do so there have been provided governor arms 38 which are pivotally mounted by pins 39 and yieldably held out of blocking relation to the slots 37 by springs 40 which urge them towards the position shown in Figures 2 and 4. As the speed of the driven shaft increases centrifugal force swings the governor arms outwardly and the arms move across the slots to block flow of liquid through the slots, as shown in Figure 6. Blocking of the slots retards movement of the liquid from the chamber 21 into the pocket 26 and thus checks rotation of the rotor 28 and the driven shaft. Therefore the rotary motion transmitted to the driven shaft 11 will be automatically controlled and maintained at a predetermined rate without varying the speed at which the drive shaft rotates. The valves or arms 38 are limited in their outward movement by means of stop pins 38ª.

Having thus described the invention, what is claimed is:

1. In a hydraulic transmission, a casing having a main chamber and an auxiliary chamber therein, a drive shaft and a driven shaft rotatably mounted through side walls of said casing in alignment and having inner end portions entering the main chamber, an impeller in the main chamber fixed to the drive shaft, a rotor in the main chamber fixed to the driven shaft and surrounding said impeller, springs urging said shafts inwardly and maintaining the impeller and the rotor in operative relation to each other, said rotor having a portion partitioning the chambers from each other and formed with openings for flow of liquid from the auxiliary chamber into the main chamber, there being a passage for return of liquid from the main chamber into the auxiliary chamber, governor arms pivoted to said rotor and movable by centrifugal force into position for blocking said openings, and spring yieldably holding said governor arms out of blocking position.

2. In a hydraulic transmission, a casing having a main chamber and an auxiliary chamber therein, a drive shaft and a driven shaft rotatably mounted through side walls of said casing in alignment and having inner end portions entering the main chamber, an impeller in the main chamber fixed to the drive shaft, a rotor in the main chamber fixed to the driven shaft and surrounding said impeller, said rotor having a portion partitioning the chambers from each other and formed with openings for flow of liquid from the auxiliary chamber into the main chamber, there being a passage for return of liquid from the main chamber into the auxiliary chamber, governor arms pivoted to the rotor and movable by centrifugal force into position for blocking said openings, and springs yieldably holding said governor arms out of blocking position.

3. In a hydraulic transmission, a casing having a main chamber and an auxiliary chamber, a driving impeller and a driven rotor in said main chamber, a plate carried by said rotor separating said chambers from each other and formed with openings for flow of liquid from the auxiliary chamber into the main chamber, said casing formed with a passage for return of liquid from the main chamber into the auxiliary chamber, governor arms pivoted to the rotor and movable by centrifugal force into position for blocking said openings.

LAWRENCE F. HALLER.

REFERENCES CITED

The following references are of record in the file of this patent:

UNITED STATES PATENTS

| Number | Name | Date |
| --- | --- | --- |
| 905,885 | Kingman | Dec. 8, 1908 |
| 1,291,871 | Hein | Jan. 21, 1919 |
| 1,428,586 | Garrison | Sept. 12, 1922 |
| 1,888,881 | Murphy | Nov. 22, 1932 |
| 2,006,136 | Grimsley | June 25, 1935 |
| 2,195,561 | Dickerson | Apr. 2, 1940 |

FOREIGN PATENTS

| Number | Country | Date |
| --- | --- | --- |
| 133 | Great Britain | 1907 |